United States Patent [19]
Prücklmayer

[11] Patent Number: 6,087,866
[45] Date of Patent: Jul. 11, 2000

[54] CIRCUIT FOR PRODUCING A RESET SIGNAL

[75] Inventor: Stephan Prücklmayer, München, Germany

[73] Assignee: Siemens Aktiengesellschaft, Munich, Germany

[21] Appl. No.: 09/131,810

[22] Filed: Aug. 10, 1998

[30] Foreign Application Priority Data

Aug. 8, 1997 [DE] Germany .......................... 197 34 421

[51] Int. Cl.[7] ...................................................... H03L 7/00
[52] U.S. Cl. .............................. 327/143; 327/63; 327/68; 327/70
[58] Field of Search .................................. 327/63, 64, 65, 327/68, 69, 70, 72, 77, 82, 142, 143, 198, 205

[56] References Cited

U.S. PATENT DOCUMENTS

| | | | |
|---|---|---|---|
| 4,260,907 | 4/1981 | Winebarger | 307/264 |
| 4,309,627 | 1/1982 | Tabata | 307/362 |
| 4,727,270 | 2/1988 | Payne | 307/540 |
| 5,214,316 | 5/1993 | Nagai | 307/272.3 |
| 5,592,112 | 1/1997 | Nishibe | 327/87 |
| 5,629,642 | 5/1997 | Yoshimura | 327/142 |

FOREIGN PATENT DOCUMENTS

4443606C1  8/1996  Germany .

OTHER PUBLICATIONS

Malcolm, "Fundamentals of Electronics", Breton Publishers, Massachusetts, pp. 91–92, 1987.
Japanese Patent Abstract No. 07095019A (Hiroshi), dated Apr. 7, 1995.
"Halbleiter–Schaltungstechnik", Ulrich Tietze et al., 7th edition. 1985, Chapter 21.1.1, pp. 637–639.

*Primary Examiner*—Jeffrey Zweizig
*Attorney, Agent, or Firm*—Herbert L. Lerner; Laurence A. Greenberg; Werner H. Stemer

[57] ABSTRACT

A circuit for producing a reset signal includes a voltage divider at which a first voltage proportional to a supply voltage can be tapped off. A resistor and a Zener diode disposed in the reverse direction are connected between the supply voltage and ground in a series circuit at which a second voltage can be tapped off. A difference signal between the first and second voltages is supplied to a first bistable multivibrator. An output signal from the first multivibrator is supplied to a low-pass filter configuration. A difference signal between an output signal from the low-pass filter configuration and the second voltage is supplied to a second bistable multivibrator. The multivibrators each exhibit hysteresis. A reset signal can be tapped off at the second multivibrator.

2 Claims, 2 Drawing Sheets

CIRCUIT FOR PRODUCING A RESET SIGNAL

BACKGROUND OF THE INVENTION

FIELD OF THE INVENTION

The invention relates to a circuit for producing a reset signal, having a voltage divider at which a voltage proportional to a supply voltage can be tapped off, and a low-pass filter configuration.

Such a circuit is necessary in any electronic device which has components that are able to process digital signals. When the device switches from a turned-off state to a turned-on state, undefined and/or impermissible states which are to be avoided may occur in those components. There is therefore a need for a circuit which, during a rise of the supply voltage to its rated value, places those components in a predefined state from which operation can be started once the rated value of the supply voltage has been reached.

Typically, the components in question have a reset terminal which places the component concerned in a predefined state when a specific level is applied to that terminal. If no such level is applied at a given time, the component is in a normal operating state. Reset circuits are known having an output which remains at the specific level until the supply voltage has reached its rated value. In that regard, reference is made, by way of example, to a book entitled "Halbleiter-Schaltungstechnik [Semiconductor Circuitry] by Tietze and Schenk, 7th edition, 1985, Chapter 21.1.1 "Reset-Logik" [Reset Logic], pages 637 to 639. Another circuit configuration for producing a reset signal is disclosed, for example, in German Patent DE 44 43 606 C1.

In practice, such reset circuits are obtainable as separate components. That is disadvantageous, however, because such an additional component takes up a corresponding amount of space on a printed circuit board. That is an obstacle to the aim of smaller and smaller module sizes and higher integration densities. Furthermore, reset circuits should also output a reset signal whenever the supply voltage drops below a specific threshold. That function is known as undervoltage detection.

U.S. Pat. No. 4,727,270 discloses a pulse sensor which is insusceptible to noise. The sensor has a series circuit including a first Schmitt trigger, a low-pass filter and a second Schmitt trigger. An output signal from the second Schmitt trigger is fed back to an input signal for the first Schmitt trigger. The circuit disclosed is used for receiving and initial processing of a sensor signal.

SUMMARY OF THE INVENTION

It is accordingly an object of the invention to provide a circuit for producing a reset signal, which overcomes the hereinafore-mentioned disadvantages of the heretofore-known devices of this general type and which while fulfilling the requirements of a reset signal has a structure that enables it to be integrated in a component to be reset.

With the foregoing and other objects in view there is provided, in accordance with the invention, a circuit for producing a reset signal, comprising a voltage divider and a low-pass filter configuration. A voltage which is proportional to the supply voltage can be tapped off at the voltage divider. The low-pass filter configuration is constructed to enable a time constant to be set. The circuit has a first and a second bistable multivibrator, which each exhibit hysteresis. Finally, the circuit has a series circuit including a first resistor and a Zener diode which is connected between the supply voltage terminal and the ground terminal. In this instance, the Zener diode is connected in the reverse direction between these connections. A second voltage can be tapped off at a connection node between the first resistor and the Zener diode. The first voltage, which can be tapped off at the voltage divider, and the second voltage, which can be tapped off at the Zener diode, are used to form a difference signal which is supplied to the first bistable multivibrator. The output terminal of the first bistable multivibrator is supplied to the low-pass filter configuration. The difference signal formed from the output signal from the low-pass filter configuration and the second voltage is supplied to the second multivibrator, at the output of which the reset signal can be tapped off. A reset signal is displayed if a logic "0" is produced at the output terminal of the second bistable multivibrator, i.e. the terminal is roughly at ground potential. The particular advantage of this circuit is that the circuit assures high temperature stability due to the fact that a Zener diode is used, and yet it can be implemented inexpensively due to the circuit structure, particularly when an integrated solution is chosen.

In accordance with another feature of the invention, the first and the second multivibrator are Schmitt triggers. These are preferably constructed from comparators which have the respective difference signals formed at their inputs.

In accordance with a concomitant feature of the invention, the low-pass filter configuration includes a series circuit composed of a second resistor and a capacitor. This series circuit is connected between the supply voltage terminal and the ground terminal. A node situated between the second resistor and the capacitor is connected to the output terminal of the first multivibrator and to one input terminal of the second multivibrator.

A specific inception voltage can be stipulated by appropriately dimensioning the voltage divider. The length of the reset signal can be defined through the use of the time constant of the low-pass filter. The switching threshold is essentially defined by the choice of the breakdown voltage of the Zener diode. Accordingly, with appropriate dimensioning, the circuit according to the invention can be used to define the parameters that are relevant for such a circuit. If dimensioned appropriately, the reset circuit outputs a reset signal, even during operation, if excessive voltage fluctuations occur in the supply voltage.

Other features which are considered as characteristic for the invention are set forth in the appended claims.

Although the invention is illustrated and described herein as embodied in a circuit for producing a reset signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 shows graphs of voltage waveforms when turning on.

DESCRIPTION OF THE PREFERRED EMBODIMENTS

Figure 1:
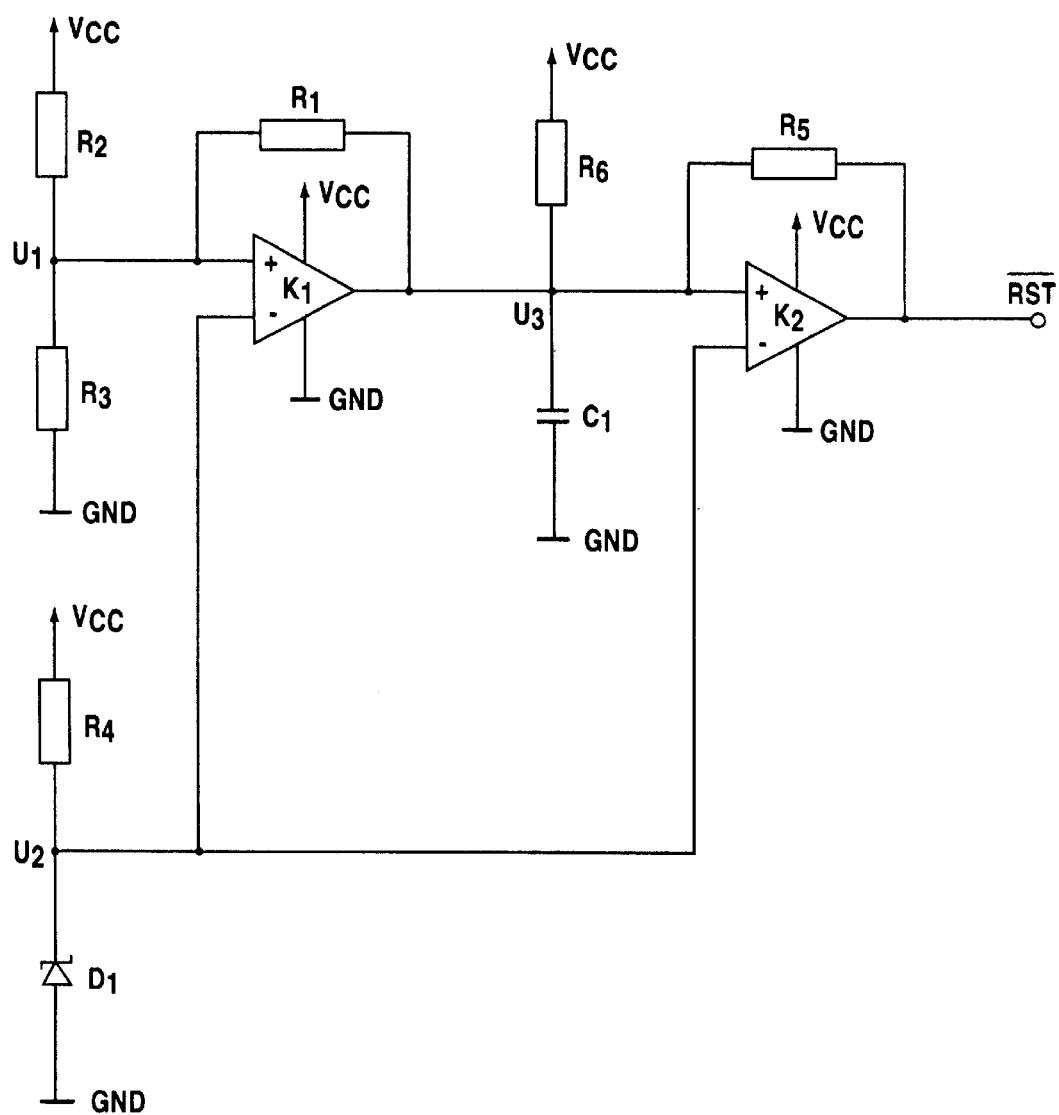
FIG. 1 is a schematic diagram of a circuit for producing a reset signal according to the invention.
Figure 2A:
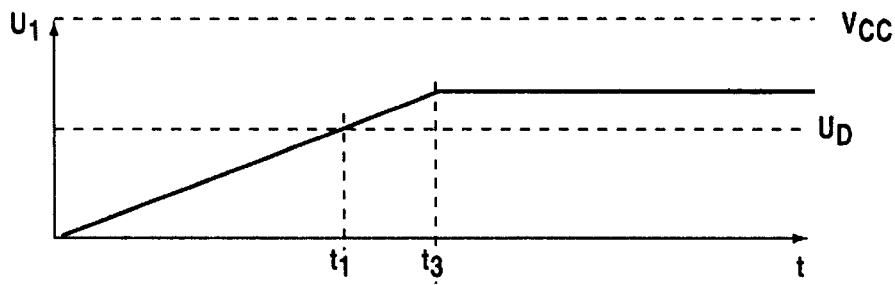
Figure 2B:
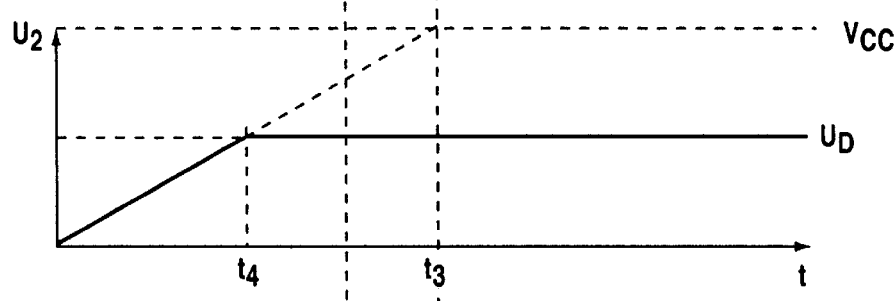
Figure 2C:
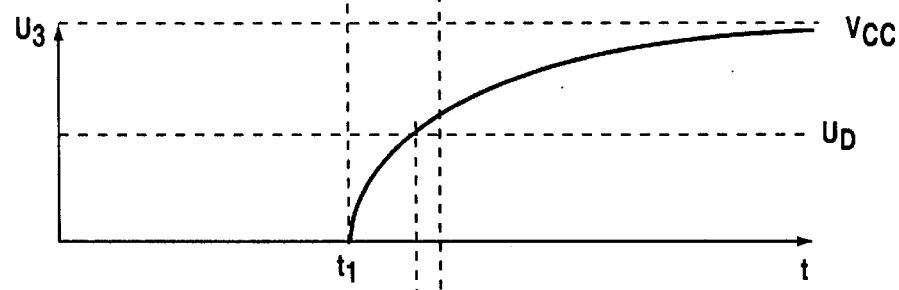
Figure 2D:
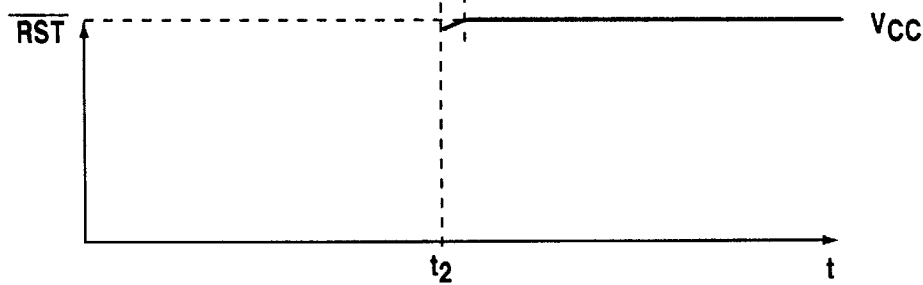

Referring now to the figures of the drawings in detail and first, particularly, to FIG. 1 thereof, there is seen a circuit that has a first, a second and a third series circuit which are each connected between a supply voltage terminal $V_{CC}$ and a ground terminal GND, wherein $V_{CC}$ is a positive voltage with respect to ground potential. The first series circuit includes resistors R2 and R3 which form a voltage divider. A node connecting the resistors $R_2$ and $R_3$ has a voltage $U_1$ across it, which is proportional to the supply voltage $V_{CC}$.

The second series circuit includes a resistor $R_4$ and a Zener diode $D_1$. In this instance, the Zener diode $D_1$ is connected in reverse direction with respect to the supply voltage $V_{CC}$. An anode of the Zener diode $D_1$ is connected to the ground terminal, and a cathode of the Zener diode $D_1$ is connected to the resistor R4. The cathode of the Zener diode $D_1$ has a voltage $U_2$ across it, which is essentially equal to the supply voltage $V_{CC}$, if the latter is lower than a breakdown voltage of the Zener diode $D_1$. Once the supply voltage has exceeded the breakdown voltage, the voltage $U_2$ remains roughly at the level of the breakdown voltage.

The third series circuit includes a resistor $R_6$ and a capacitor $C_1$. The resistor $R_6$ is connected on the supply voltage side, while the capacitor $C_1$ is connected on the ground side. A node connecting the resistor $R_6$ and the capacitor $C_1$ has a voltage $U_3$ across it, which corresponds essentially to the supply voltage waveform having been subjected to low-pass filtering. The resistor $R_6$ and the capacitor $C_1$ determine a time constant which constitutes a waveform for a response to a sudden change in the supply voltage.

The circuit shown in FIG. 1 additionally has two bistable multivibrators which are Schmitt triggers in the preferred exemplary embodiment. The first Schmitt trigger has a comparator $K_1$ with an output signal that is fed back through a resistor $R_1$ to a positive input of the comparator $K_1$. The second Schmitt trigger has a comparator $K_2$ with an output signal that is fed back through a resistor $R_5$ to a positive input connection. The positive feedback loops of the comparators make the Schmitt triggers exhibit hysteresis. Hysteresis switching levels can be defined by appropriately dimensioning the positive feedback resistors $R_1$ and $R_5$. Like the other circuit parts, the comparators $K_1$ and $K_2$ are powered by the supply voltage $V_{CC}$ with respect to ground GND. The comparators used in the preferred exemplary embodiment are operational amplifiers of the generally available type LM393.

The node or center tap of the first series circuit having the voltage $U_1$, i.e. the voltage split from $V_{CC}$, is connected to the positive input of the first comparator $K_1$, and the node or center tap of the second series circuit having the voltage $U_2$, i.e. the cathode connection of the Zener diode $D_1$, is connected to a negative connection of the first comparator $K_1$. An output terminal of the first comparator $K_1$ is connected to the node or center tap of the third series circuit, i.e. to the supply voltage waveform which has essentially been subjected to low-pass filtering.

The node or center tap of the third series circuit is connected to the positive input terminal of the second comparator $K_2$, while the node or center tap of the second series circuit is connected to a negative terminal of the second comparator $K_2$. An inverted reset signal $\overline{RST}$ can be tapped off at the output terminal of the second comparator $K_2$.

The operating principle of the circuit will be described below with reference to FIGS. 2a to 2d.

FIG. 2, waveform A shows a waveform for the voltage $U_1$, which can be tapped off at the connection node of the first series circuit. In a first approximation, it is assumed that a rise in the supply voltage from 0 V to a rated value $V_{CC}$ at an instant $t_3$ takes place in a linear manner. Accordingly, the voltage $U_1$ also rises linearly up to the instant $t_3$ and then remains constant at the level of the supply voltage $V_{CC}$ divided by the resistors $R_2$ and $R_3$.

FIG. 2, waveform B shows a waveform for the voltage $U_2$ at the connection node of the second series circuit. Up to an instant $t_4$, the voltage $U_2$ rises unerringly with the supply voltage. At the instant $t_4$, the voltage across the Zener diode $D_1$ reaches a breakdown voltage $U_D$, SO that the voltage $U_2$ remains roughly at the value of the breakdown voltage $U_D$ as the supply voltage $V_{CC}$ rises further. While the voltage $U_1$ is lower than the voltage $U_2$, the output potential of the comparator $K_1$ is at ground potential GND. When the voltage $U_1$ exceeds the voltage $U_2$, which happens at an instant $t_1$, the comparator $K_1$ increases its output potential.

FIG. 2, waveform C shows a waveform for the voltage $U_3$ across the connection node of the third series circuit. Since the output potential of the comparator $K_1$ is roughly at ground up to the instant $t_1$, the voltage $U_3$ likewise remains at ground up to this instant. Once the comparator $K_1$ has changed state, the voltage $U_3$ can also rise, which roughly occurs with the time constant of the resistor $R_6$ and the capacitor $C_1$.

FIG. 2, waveform D shows a waveform for the output signal $\overline{RST}$. When the voltage $U_3$, which rises from the instant $t_1$, exceeds the voltage $U_2$, which is then roughly at the breakdown voltage $U_D$, the second comparator $K_2$ also changes state, and its output potential quickly rises roughly to the level of the supply voltage that is currently present. At the instant $t_2$, this supply voltage has already reached the rated value $V_{CC}$ or, as shown in FIGS. 2a to 2d in which the instant $t_3$ at which the supply voltage has reached its rated value comes slightly after the instant $t_2$ at which the second comparator $K_2$ changes state, has reached the rated value of the supply voltage $V_{CC}$ within the limits required.

It should be pointed out that FIG. 2, waveform A to D do not take the switching hysteresis of the comparators $K_1$ and $K_2$ into account.

Similarly, the signal waveforms illustrated are of a purely schematic nature, and the instants $t_1$ to $t_4$ illustrated in FIGS.

2a to 2d are strongly dependent on the dimensioning of the components being used.

The circuit provides assurance that integrated circuits having internal logic configurations are started correctly.

Furthermore, the circuit enables resetting to be initiated during operation if excessive voltage fluctuations occur. The exemplary circuit assures hysteresis, which is necessary in order to preclude faulty operation in the area of the switching threshold. With a supply voltage $V_{CC}$ of 5 V the switching threshold is around 4.2 V and with a supply voltage $V_{CC}$ of 3.3 V, it is around 2.8 V.

The reset generator components that have been used to date in conjunction with integrated circuits may be omitted by integrating the circuit according to the invention in a circuit which is to be reset, which leads to a considerable reduction in costs. The switching hysteresis may be defined by the dimensioning of the resistors $R_1$ and $R_5$, and the length of the reset signal may be defined by the dimensioning of the capacitor $C_1$ and the resistor $R_6$. The inception voltage of the reset circuit is defined by the dimensions of the voltage divider resistors $R_2$ and $R_3$, and by the dimensioning of the breakdown voltage $U_D$ of the Zener diode $D_1$. A switching hysteresis between 4.1 V and 4.5 V and a reset time of 100 ms can be achieved with a supply voltage $V_{CC}$ of 5 V by using operational amplifiers of the type LM 393 as comparators, a Zener diode having a breakdown voltage $U_D$ of 2.7 V and the dimensions $R_1$=500 k$\Omega$, $R_2$=18 k$\Omega$, $R_3$22 k$\Omega$, $R_4$=1 k$\Omega$, $R_5$47 k$\Omega$), $R_6$=10 k$\Omega$ and C1=15 $\mu$F.

I claim:

1. A circuit for producing a reset signal, comprising:

a voltage divider for tapping off a first voltage proportional to a supply voltage;

a series circuit of a resistor and a Zener diode connected in reverse direction, between the supply voltage and ground for tapping off a second voltage;

a first Schmitt trigger having a comparator with a positive input receiving the first voltage, a negative input receiving the second voltage and an output supplying an output signal;

a low-pass filter configuration having a node receiving the output signal from said comparator of said first Schmitt trigger; and a second Schmitt trigger having a comparator with a positive input receiving the output signal from said comparator of said first Schmitt trigger, a negative input receiving the second voltage and an output for tapping off a reset signal.

2. The circuit according to claim 1, wherein said low-pass filter configuration is connected between the supply voltage and the ground and has a series circuit including another resistor and a capacitor connected together at said node, said node connected to said output of said comparator of said first Schmitt trigger and to said positive input of said comparator of said second Schmitt trigger.

* * * * *